(12) United States Patent
Huang et al.

(10) Patent No.: US 7,286,271 B2
(45) Date of Patent: Oct. 23, 2007

(54) SCANNING CHASSIS WITH A LIGHT TRANSPARENT SLOT

(75) Inventors: Yin-Chun Huang, Hsinchu (TW); Chien-Liang Yeh, Hsinchu (TW)

(73) Assignee: Transpacific IP, Ltd., Taipei (TW)

( * ) Notice: Subject to any disclaimer, the term of this patent is extended or adjusted under 35 U.S.C. 154(b) by 824 days.

(21) Appl. No.: 10/063,782

(22) Filed: May 13, 2002

(65) Prior Publication Data

US 2003/0210438 A1    Nov. 13, 2003

(51) Int. Cl.
*H04N 1/04* (2006.01)
(52) U.S. Cl. .................. 358/475; 358/487; 358/509; 313/114
(58) Field of Classification Search ........... 358/474, 358/496, 498, 475, 487, 509; 40/582, 208, 40/616; 351/158; 349/13, 41; 313/506, 313/500, 504–505, 114; 399/4, 220
See application file for complete search history.

(56) References Cited

U.S. PATENT DOCUMENTS

| | | | | |
|---|---|---|---|---|
| 3,973,342 A | * | 8/1976 | Gubela | 40/582 |
| 6,046,826 A | * | 4/2000 | Lu et al. | 358/475 |
| 6,404,515 B1 | * | 6/2002 | Onda et al. | 358/474 |
| 6,891,328 B2 | * | 5/2005 | Nakamura et al. | 313/506 |

* cited by examiner

*Primary Examiner*—Aung S. Moe
*Assistant Examiner*—Heather D Gibbs
(74) *Attorney, Agent, or Firm*—Stolowitz Ford Cowger LLP

(57) ABSTRACT

A scanning chassis is suited for scanning a document. The scanning chassis includes a case, a light source, at least one reflector, a lens assembly and an optical sensor. The case has a light transparent slot shaped like a bar form, wherein the widths corresponding to the points along the longitudinal direction of the light transparent slot are not all the same. The light source can illuminate the document and an image can be generated at the place where the document is illuminated by the light source. The image can be projected on the reflector through the light transparent slot. The image can be projected on the lens assembly by the reflector's reflecting the image. The image can be projected on the optical sensor after the image passes through the lens assembly.

14 Claims, 2 Drawing Sheets

SCANNING CHASSIS WITH A LIGHT TRANSPARENT SLOT

BACKGROUND OF INVENTION

1. Field of the Invention

The invention relates in general to a scanning chassis with a light transparent slot. More particularly, the invention relates to a scanning chassis with a light transparent slot shaped like dual trumpets.

2. Description of the Related Art

With improvement of computer performance and high development of multimedia technology, analogical images of words or patterns can be captured using an optical scanner, and then transformed into digital signals. As a result, after the process of transforming the analogical images into the digital signals, an image file can be showed, identified, edited, saved or output by a computer or other instruments.

In a scanning system, one of the critical factors affecting scanning qualities is whether an image of a scanned document can be accurately received by an optical sensor so that the optimum effect of receiving the image can be obtained under the optimum operation of the optical sensor. However, in general, it is possible that the effect of dispersion of light makes the image of a scanned document not accurately to be received by the optical sensor. Referring to FIG. 1 and FIG. 2, FIG. 1 is a schematic view showing the internal structure of a conventional scanning chassis; FIG. 2 is a top view schematically showing a conventional light transparent slot. A scanning chassis 100 mounted under a glass panel 190 is suited for scanning a document 180 put on the glass panel 190. The scanning chassis 100 can move in a right or left direction to scan the document 180. The scanning chassis 100 includes a case 110, a light source 120, three reflectors 130, a lens assembly 140, an optical sensor 150 and a printed circuit board 160. The light source 120 is mounted on a light carrier 118 of the case 110 and neighbors the glass panel 190. The reflector 130 and the lens assembly 140 are mounted inside the case 110. The optical sensor 150 is mounted on the printed circuit board 160 screwed on the case 110. The optical sensor 150 can be electrically connected with the printed circuit board 160. The case 110 has a light transparent slot 112 through which the image 124 of the document 190 can pass into the inside of the case 110. The light source 120 is, for example, a fluorescent lamp that can emanate light 122. The light 122 can illuminate the document 180 through the glass panel 190 and an image 124 can be generated at the place where the document 180 is illuminated by the light 122. Passing through the glass panel 190 and the light transparent slot 112, the image 124 can be projected on the reflector 130 and then the reflector 130 can reflect the image 124 in order that the image 124 can be projected on the lens assembly 140. Subsequently, the lens assembly 140 can refract the image 124 and then the refracted image 124 can be projected on the optical sensor 150.

As shown in FIG. 2, the conventional light transparent slot 112 shapes like a rectangle. In general, dispersion of light passes into the case 110 through the middle region of the light transparent slot 112 shaped like a rectangle with higher probability than through the two sides of the light transparent slot 112. That leads the tinge, sensed by the optical sensor, of the image of the document to be different because of different places where the document is put. Therefore, the quality of the image 124 can be lowered and noises can be increased.

SUMMARY OF INVENTION

Accordingly, an objective of the present invention is to provide a scanning chassis with a light transparent slot shaped like a special form. The widths corresponding to the points along the longitudinal direction can be adjusted based on the width of the light cone of the image, the allowable error of the reflected angles of the reflectors and the allowable error of inclining the optical sensor. As a result, the occurrence that the tinge, sensed by the optical sensor, of the image of the document is different because of different places where the document is put can be reduced. The quality of the optical sensor's sensing the image can be enhanced and noises can be decreased.

To achieve the foregoing and other objectives, the present invention provides a scanning chassis. The scanning chassis is suited for scanning a document. The scanning chassis includes a case, a light source, at least one reflector, a lens assembly and an optical sensor. The case has a light transparent slot shaped like a bar form, wherein the widths corresponding to the points along the longitudinal direction of the light transparent slot are not all the same. The light source can illuminate the document and an image can be generated at the place where the document is illuminated by the light source. The image can be projected on the reflector through the light transparent slot. The image can be projected on the lens assembly by the reflector's reflecting the image. The image can be projected on the optical sensor after the image passes through the lens assembly.

According to a preferred embodiment of the present invention, the widths corresponding to the points at the two sides of the light transparent slot are lager than the width corresponding to the point at the middle region of the light transparent slot. The width corresponding to the point at the middle region is determined by the width of the light cone of the image and the allowable error of the reflected angles of the reflectors. The widths corresponding to the points at the two sides are determined by the width of the light cone of the image, the allowable error of the reflected angles of the reflectors and the allowable error of inclining the optical sensor. The light transparent slot is shaped like dual trumpets. Beside, the optical sensor can be a charge coupled device or a CMOS image sensor. The light source can be a fluorescent lamp. In addition, the light transparent slot is formed while the case is fabricated by injection molding.

To sum up, the widths corresponding to the points along the longitudinal direction of the light transparent slot are not all the same. The widths corresponding to the points along the longitudinal direction can be adjusted based on the width of the light cone of the image, the allowable error of the reflected angles of the reflectors and the allowable error of inclining the optical sensor. As a result, the occurrence that the tinge, sensed by the optical sensor, of the image of the document is different because of different places where the document is put can be reduced. The quality of the optical sensor's sensing the image can be enhanced and noises can be decreased.

Both the foregoing general description and the following detailed description are exemplary and explanatory only and are not restrictive of the invention, as claimed. It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. A simple description of the drawings is as follows.

DETAILED DESCRIPTION

Figure 1:
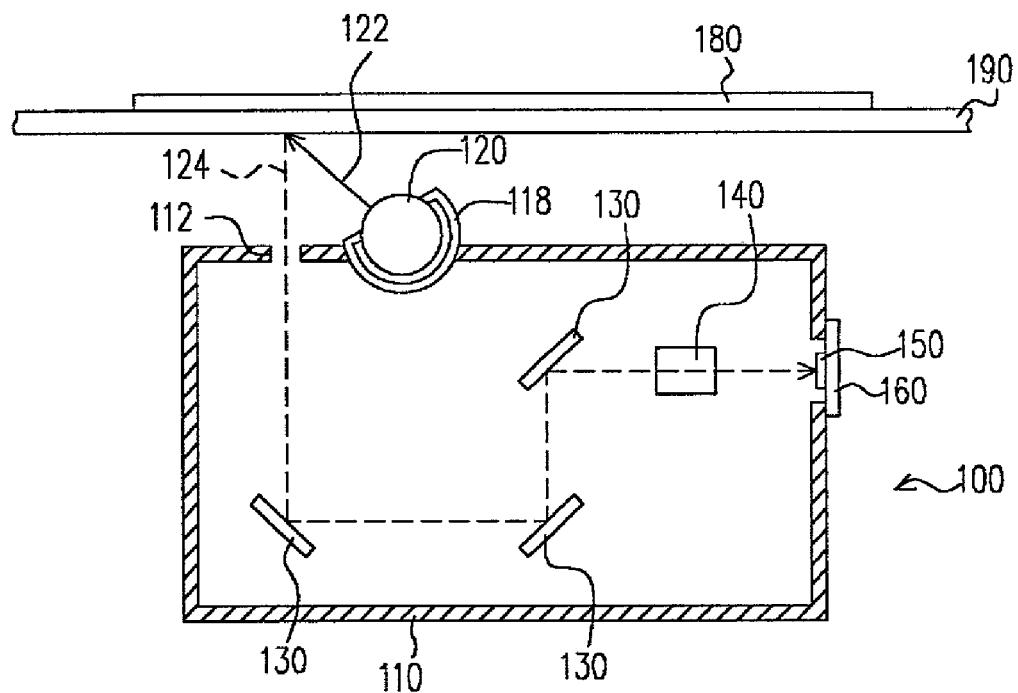
FIG. 1 is a schematic view showing the internal structure of a conventional scanning chassis.
Figure 2:
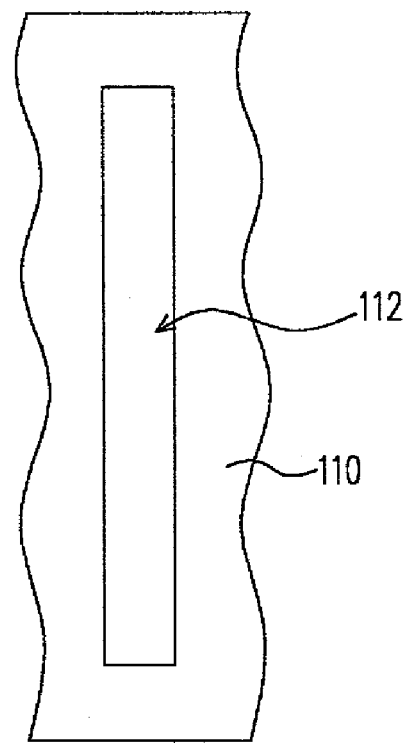
FIG. 2 is a top view schematically showing a conventional light transparent slot.
Figure 3:
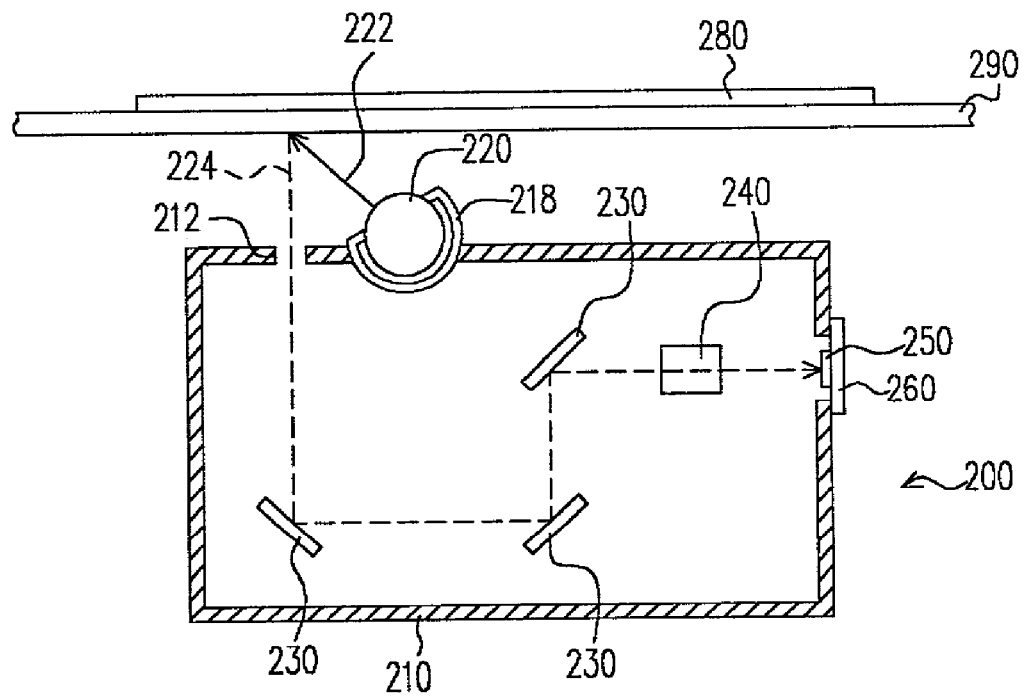
FIG. 3 is a schematic view showing the internal structure of a scanning chassis according to an embodiment of the present invention.
Figure 4:
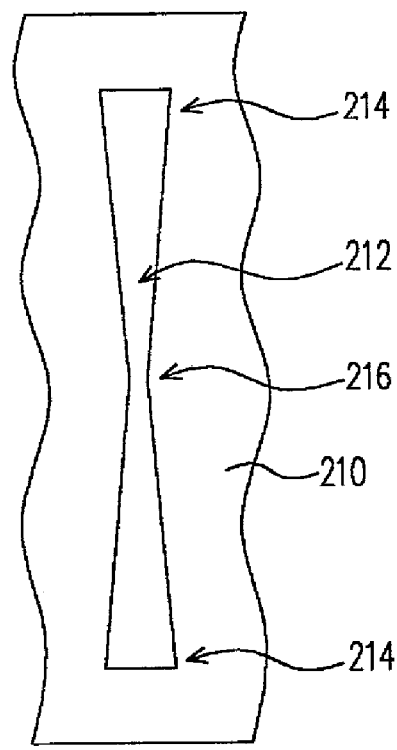
FIG. 4 is a top view schematically showing a light transparent slot according to an embodiment of the present invention.

Referring to FIG. 3 and FIG. 4, FIG. 3 is a schematic view showing the internal structure of a scanning chassis according to an embodiment of the present invention; FIG. 4 is a top view schematically showing a light transparent slot according to an embodiment of the present invention. A scanning chassis 200 mounted under a glass panel 290 is suited for scanning a document 280 put on the glass panel 290. The scanning chassis 200 can move in a right or left direction to scan the document 280. The scanning chassis 200 includes a case 210, a light source 220, three reflectors 230, a lens assembly 240, an optical sensor 250 and a printed circuit board 260. The light source 220 is mounted on a light carrier 218 of the case 210 and neighbors the glass panel 290. The reflector 230 and the lens assembly 240 are mounted inside the case 210. The optical sensor 250, such as a charge coupled device (CCD) or a CMOS image sensor, is mounted on the printed circuit board 260 screwed on the case 210. The optical sensor 250 can be electrically connected with the printed circuit board 260. The case 210 has a light transparent slot 212 through which the image 224 of the document 290 can pass into the inside of the case 210. The light source 220 is, for example, a fluorescent lamp that can emanate light 222. The light 222 can illuminate the document 280 through the glass panel 290 and an image 224 can be generated at the place where the document 280 is illuminated by the light 222. Passing through the glass panel 290 and the light transparent slot 212, the image 224 can be projected on the reflector 230 and then the reflector 230 can reflect the image 224 in order that the image 224 can be projected on the lens assembly 240. Subsequently, the lens assembly 240 can refract the image 224 and then the refracted image 224 can be projected on the optical sensor 250.

Referring to FIG. 4, the widths corresponding to the points along the longitudinal direction of the light transparent slot 212 are not all the same, wherein the widths corresponding to the points at the two sides 214 are lager than the width corresponding to the point at the middle region 216. The width corresponding to the point at the middle region 216 is determined by the width of the light cone of the image 224 and the allowable error of the reflected angles of the reflectors 230 that are multiplied by a safety coefficient. The widths corresponding to the points at the two sides 214 are determined by the width of the light cone of the image 224, the allowable error of the reflected angles of the reflectors 230 and the allowable error of welding the optical sensor 250 onto the printed circuit board 260 that are multiplied by a safety coefficient. The allowable error of welding the optical sensor 250 onto the printed circuit board 260 is the allowable error of inclining the optical sensor 250. Because the factors affecting the error variation of the width corresponding to the point at the middle region 216 are fewer than those affecting the error variation of the widths corresponding to the points at the two sides 214, the width corresponding to the point at the middle region 216 can be designed to be smaller than the widths corresponding to the points at the two sides 214. The light transparent slot 212 is shaped like dual-trumpets. Besides, the light transparent slot 212 can be formed while the case 210 is fabricated by injection molding.

According to the above design conception, the width corresponding to the point at the middle region 216 can be designed to be smaller than the widths corresponding to the points at the two sides 214. Therefore, dispersion of light passes into the case 210 through the middle region 216 of the light transparent slot 212 shaped like dual-trumpets with relatively low probability. The occurrence that the tinge, sensed by the optical sensor 250, of the image 224 of the document 280 is different because of different places where the document 280 is put can be reduced. The quality of the optical sensor'250 sensing the image 224 can be enhanced and noises can be decreased.

In addition, the above-mentioned scanning chassis is suited for the document that is not transparent. However, the present invention also can be applied to a scanning chassis capable of scanning a transparent document that is a conventional technology and, thus, that is not repeated herein.

To sum up, the widths corresponding to the points along the longitudinal direction of the light transparent slot are not all the same. The widths corresponding to the points along the longitudinal direction can be adjusted based on the width of the light cone of the image, the allowable error of the reflected angles of the reflectors and the allowable error of inclining the optical sensor. As a result, the occurrence that the tinge, sensed by the optical sensor, of the image of the document is different because of different places where the document is put can be reduced. The quality of the optical sensor's sensing the image can be enhanced and noises can be decreased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A scanning chassis, comprising:
 a case comprising a light transparent slot comprising a substantially bar form shape, wherein widths corresponding to points at two sides of the light transparent slot are larger than a width corresponding to a point at a middle region of the light transparent slot, and wherein the width corresponding to the point at the middle region is determined at least by a width of a light cone of the image and an allowable error of one or more reflected angles of said at least one reflector;
 a light source capable of illuminating a document and generating an image at the place where the document is illuminated by the light source;
 at least one reflector capable of reflecting the image projected through the light transparent slot;

a lens assembly capable of refracting the image from said at least one reflector;

an optical sensor capable of receiving the image from said lens assembly; and wherein the light transparent slot is located along an image path between the light source and the lens assembly.

2. A scanning chassis, comprising:

a case comprising a light transparent slot comprising a substantially bar form shape, wherein widths corresponding to points at two sides of the light transparent slot are larger than a width corresponding to a point at a middle region of the light transparent slot, and wherein the widths corresponding to the points at the two sides are determined at least by a width of a light cone of the image and an allowable error of one or more reflected angles of said at least one reflector and an allowable error of inclining the optical sensor;

a light source capable of illuminating a document and generating an image at the place where the document is illuminated by the light source;

at least one reflector capable of reflecting the image projected through the light transparent slot;

a lens assembly capable of refracting the image from said at least one reflector;

an optical sensor capable of receiving the image from said lens assembly; and wherein the light transparent slot is located along an image path between the light source and the lens assembly.

3. The scanning chassis according to claim 1, wherein the light transparent slot is substantially shaped like dual trumpets.

4. The scanning chassis according to claim 1, wherein the optical sensor comprises a charge coupled device.

5. The scanning chassis according to claim 1, wherein the optical sensor comprises a CMOS image sensor.

6. The scanning chassis according to claim 1, wherein the light source comprises a fluorescent lamp.

7. The scanning chassis according to claim 1, wherein the case comprises an injection molded case comprising an injection molded light transparent slot.

8. An apparatus, comprising:

a light transparent slot of a scanning chassis, wherein the light transparent slot comprises a substantially bar form shape, wherein widths corresponding to points at two sides of the light transparent slot are larger than a width corresponding to a point at a middle region of the light transparent slot, wherein the width corresponding to the point at the middle region is determined at least by a width of a light cone of the image and an allowable error of one or more reflected angles of said at least one reflector, wherein the light transparent slot is capable of passing an image of a document, and wherein the light transparent slot is located along an image path between a light source and a lens assembly.

9. The apparatus of claim 8, wherein the widths corresponding to the points at the two sides are determined at least by a width of a light cone of the image, an allowable error of one or more reflected angles of said at least one reflector and an allowable error of inclining the optical sensor.

10. The apparatus of claim 8, wherein the light transparent slot is substantially shaped like dual trumpets.

11. The apparatus of claim 8, wherein the optical sensor comprises a charge coupled device.

12. The light transparent slot of the scanning chassis according to claim 8, wherein the optical sensor comprises a CMOS image sensor.

13. A method, comprising:

illuminating a document to generate an image;

passing the image through a light transparent slot, wherein widths corresponding to points at two sides of the light transparent slot are larger than a width corresponding to a point at a middle region of the light transparent slot, and wherein the width corresponding to the point at the middle region is determined at least by a width of a light cone of the image and an allowable error of one or more reflected angles of said at least one reflector; and passing the image from the light transparent slot to a lens assembly.

14. The method of claim 13, further comprising determining the widths corresponding to the points at the two sides at least by a width of a light cone of the image, an allowable error of one or more reflected angles of said at least one reflector and an allowable error of inclining the optical sensor.

* * * * *